United States Patent [19]

Holton

[11] Patent Number: 4,675,195

[45] Date of Patent: Jun. 23, 1987

[54] STABLE BANANA PRODUCT

[75] Inventor: Paul E. Holton, Western Springs, Ill.

[73] Assignee: Holton Food Products Company, Chicago, Ill.

[21] Appl. No.: 826,311

[22] Filed: Feb. 5, 1986

[51] Int. Cl.⁴ ............................................. A23L 1/212
[52] U.S. Cl. .................................... 426/100; 426/102; 426/639; 426/654
[58] Field of Search ................. 426/91, 100, 102, 565, 426/101, 639, 654

[56] References Cited

U.S. PATENT DOCUMENTS

| | | | |
|---|---|---|---|
| 1,917,137 | 7/1933 | Marchio | 426/101 |
| 2,550,656 | 4/1951 | Knechtges | 426/565 |
| 3,202,516 | 8/1965 | Veale | 426/91 |
| 4,001,439 | 1/1977 | Zonni | 426/101 |
| 4,021,583 | 5/1977 | Arden | 426/91 |

FOREIGN PATENT DOCUMENTS

| | | | |
|---|---|---|---|
| 2369801 | 7/1978 | France | 426/565 |
| 1284729 | 8/1972 | United Kingdom | 426/565 |

OTHER PUBLICATIONS

Quick Frozen Foods, Apr. 1949, p. 77.

*Primary Examiner*—Jeanette Hunter
*Attorney, Agent, or Firm*—Gary, Juettner & Pyle

[57] ABSTRACT

A freeze-thaw stable banana product containing frozen ground banana pulp and a stabilizing system of agar and carob bean gum.

17 Claims, No Drawings

STABLE BANANA PRODUCT

BACKGROUND OF THE INVENTION

This invention relates to a method for producing a storage and freeze-thaw stable banana product which simulates banana pieces.

While fresh bananas are widely consumed, the use of bananas in frozen foods, such as ice cream, frozen pies, cakes, and the like, has met with considerable difficulties. If fresh banana pieces are frozen alone or in association with a food product, the pieces tend to discolor. Also, when fresh frozen banana pieces are thawed, the internal cell structure of the piece is disrupted, and the product becomes watery, mushy and otherwise unacceptable from the viewpoint of the consumer.

In view of the foregoing, it would be desirable to provide a method for providing a product which is made from fresh bananas, may be formed into pieces and frozen, while still retaining the texture and consistency of a fresh banana piece when thawed.

SUMMARY OF THE INVENTION

In accordance with the present invention, fresh bananas are ground or formed into a liquid pulp or puree. A particular blend of stabilizers, including starch and a specific combination of vegetable gums are added, and the mixture is heated. The mixture is then cooled and frozen in the form of a solid mass. Either during or after the cooling or freezing step, the solidified mixture may be formed or divided into pieces. The frozen pieces, upon thawing, very closely resemble fresh banana pieces in terms of taste and texture.

DESCRIPTION OF THE PREFERRED EMBODIMENTS

Fresh bananas are first ground into a pulp or puree of substantially uniform consistency. Small amount of water, i.e., 10 to 30% may be added to improve processing.

To the banana pulp or puree is added a stabilizing mixture of specific ingredients. The stabilizer mixture is generally described in the following table, expressed in weight percentages of the total stabilizer mixture.

|                |          |
|----------------|----------|
| Sugar          | 20–40%   |
| Starch         | 15–35%   |
| Agar           | 15–25%   |
| Carob Bean Gum | 14–24%   |
| Food Acid      | 1–4%     |
| Salt           | 0–3%     |
| Color          | .5–1.5%  |

The use of sugar, while optional, is preferred in order to facilitate addition to and absorption of the starch and gums into the banana puree without lumping. The starch is preferably corn starch, although other sources may be employed such a tapioca, wheat and rice.

The food acid is employed to reduce the pH of the mixture and to reduce browning of the pulp. The preferred food acid is citric acid. The color employed is an artificial or natural yellow color.

The use of the combination of agar and carob bean gums as the stabilizer gum system is very important. The use of either gum alone or combination with other gums will not result in an acceptable product. The agar and carob bean gum are added in substantially the same amounts, plus or minus about 10%.

From about two to about seven percent, and preferably, from about three to about six percent of the foregoing mixture in incorporated into the banana puree or pulp at room temperature. As a result, the banana pulp will contain the following percentages, by weight, of the stabilizer ingredients.

|                |              |
|----------------|--------------|
| Starch         | 0.3 to 2.5%  |
| Agar           | 0.3 to 1.8%  |
| Carob Bean Gum | 0.3 to 1.7%  |
| Food Acid      | 0.05 to .5%  |

Upon addition of the stabilizing system, the mixture is heated to a temperature above 180° F. for a period sufficient to hydrate the starch and the gums. The period of heating is not critical but should be sufficient to assure uniform heating. The mixture may be heated in a batch, or a stream may be continuously heated by passage through a heat exchanger.

The resulting hot, liquid mixture is then cooled to a temperature somewhat above the gelation point, which is typically in the order of 90° to 120° F. Upon additional cooling, the mixture will begin to gel into a solid or semi-solid. Either at this stage, or upon freezing, the solid may be formed or cut into shapes as hereinafter described.

One method of providing frozen pieces is to pour or otherwise transfer the warm liquid into a container, holding vessel or mold. The mixture may then be frozen. After the mixture is frozen in bulk, it may be cut, diced or otherwise subdivided into pieces of the desired size. The pieces are then preferably sprayed or otherwise coated with a sugar syrup to prevent sticking.

As a second alternative, the warm mixture may be deposited on a cold surface in the form of strips, sheets and the like, followed by further subdivision. Yet another method is to extrude the warm mixture through an orifice into a cold sugar syrup, and the pieces may be recovered by straining.

From the foregoing, it will be apparent that a variety of methods may be employed to cool, shape, form or divide the banana mixture in order to obtain the desired size and shape of pieces. The pieces are then frozen, preferably to a temperature below 10° F.

The resulting frozen product is unique in several respects. It may be kept in a frozen state for an indefinite period of time without degrading. Upon thawing, the product does not discolor and has the same taste, texture and mouthfeel as a piece of fresh ripe banana. The product may be frozen alone or may be incorporated as an ingredient in other frozen foods.

To further illustrate the present invention, the following example is presented.

EXAMPLE

The following stabilizing system was prepared, based on percentages by weight:

|                  |    |
|------------------|----|
| Sugar            | 34 |
| Corn Starch      | 22 |
| Agar             | 20 |
| Carob Bean Gum   | 18 |
| Citric Acid      | 3  |
| Salt             | 2  |
| Natural Turmeric | 1  |

-continued

| Color |
|---|

Three parts of the above system was added to and mixed with 100 parts ground banana pulp at room temperature. The mixture was heated to 190° F. and then cooled to 110° F. The warm liquid mixture was poured into a container and frozen at 0° F. The frozen mixture was cut into cubes, and the cubes were coated with sugar syrup and frozen in containers.

The frozen cubes, upon being thawed to room temperature, closely simulate cubes of fresh banana in terms of color, flavor and texture.

I claim:

1. A freeze-thaw stable banana product comprising a mixture of frozen ground banana pulp and a stabilizing system comprising from about 0.3 to about 1.8 percent agar and from about 0.3 to about 1.7 percent carob bean gum.

2. The banana product of claim 1 wherein said product additionally comprises starch.

3. The banana product of claim 1 wherein said product additionally comprises a food acid.

4. The banana product of claim 2 wherein said starch comprises from about 0.3 to about 2.5% of said product.

5. A freeze-thaw stable banana product comprising ground banana pulp and from about two to about seven percent, by weight of the pulp, of a stabilizing system, said system comprising by weight from about 20 to about 40% sugar, from about 15 to about 35% starch, from about 15 to about 25% agar, from about 14 to about 24% carob bean gum, and from about one to about 4% food acid.

6. A method of making a freeze-thaw stable banana product comprising the steps of providing a quantity of banana pulp in liquid form, mixing into the pulp agar and carob bean gum in sufficient quantities to render the product freeze-thaw stable, heating the mixture to a temperature above about 180° F., and thereafter cooling the mixture to a solid.

7. The method of claim 6 wherein said solid is divided into pieces.

8. The method of claim 6 wherein said mixture is frozen.

9. The method of claim 7 wherein said pieces are coated with a sugar syrup.

10. The method of claim 6 wherein said liquid mixture is extruded into a cold sugar syrup to solidify the mixture.

11. The method of claim 6 wherein said liquid mixture is deposited on a cold surface to solidify the mixture.

12. The method of claim 6 wherein the liquid mixture is placed into a container, the mixture is frozen into a solid, and the solid is subdivided into pieces.

13. The method of claim 6 wherein said product additionally comprises starch.

14. The method of claim 6 wherein said product comprises food acid.

15. The method of claim 6 wherein said agar and said carob bean gum are added equal amounts, plus or minus 10%.

16. The method of claim 6 wherein said agar is present in the amount of from about 0.3 to about 1.8%, and said carob bean gum is present in an amount from about 0.3 to about 1.7%.

17. The method of claim 16 wherein said product comprises from about 0.3 to about 2.5% starch.

* * * * *